United States Patent
Henderson et al.

(10) Patent No.: US 10,828,732 B2
(45) Date of Patent: Nov. 10, 2020

(54) TREATED TURBINE DIAPHRAGM AND METHOD FOR TREATING A TURBINE DIAPHRAGM

(71) Applicant: GENERAL ELECTRIC COMPANY, Schenectady, NY (US)

(72) Inventors: Brian Leslie Henderson, Simpsonville, SC (US); Yan Cui, Greer, SC (US); Daniel James Dorriety, Travelers Rest, SC (US); Ravikumar Rayachuri, Dammam (SA); Paul Albert Cook, Greenville, SC (US); Abdul Rahman Shariff, Dammam (SA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 548 days.

(21) Appl. No.: 15/499,481

(22) Filed: Apr. 27, 2017

(65) Prior Publication Data
US 2018/0313226 A1    Nov. 1, 2018

(51) Int. Cl.
| | | |
|---|---|---|
| *B23P 6/00* | (2006.01) | |
| *F01D 25/24* | (2006.01) | |
| *F23R 3/00* | (2006.01) | |
| *B23P 15/00* | (2006.01) | |

(Continued)

(52) U.S. Cl.
CPC .......... *B23P 6/005* (2013.01); *B23K 35/0244* (2013.01); *B23P 15/006* (2013.01); *F01D 25/005* (2013.01); *F01D 25/24* (2013.01); *F23R 3/002* (2013.01); *F05D 2230/22* (2013.01);

(Continued)

(58) Field of Classification Search
None
See application file for complete search history.

(56) References Cited

U.S. PATENT DOCUMENTS

| | | | | |
|---|---|---|---|---|
| 3,072,381 A | * | 1/1963 | Lameris | F01D 9/044 |
| | | | | 416/213 R |
| 5,522,134 A | * | 6/1996 | Rowe | B23P 6/005 |
| | | | | 29/402.08 |
| 9,303,515 B2 | * | 4/2016 | Singh | F01D 5/005 |

(Continued)

FOREIGN PATENT DOCUMENTS

| | | |
|---|---|---|
| EP | 0 461 589 A1 | 12/1991 |
| EP | 1 559 868 A2 | 8/2005 |

(Continued)

OTHER PUBLICATIONS

Extended European Search Report and Opinion issued in connection with corresponding EP Application No. 18169522.2 dated Sep. 26, 2018.

*Primary Examiner* — Xiaobei Wang
(74) *Attorney, Agent, or Firm* — McNees Wallace & Nurick LLC

(57) ABSTRACT

A method for treating a turbine diaphragm and a treated turbine diaphragm are provided. The method includes the step of removing a portion of the turbine diaphragm. The method further includes the step of forming a coupon having a geometry that corresponds to the portion of the turbine diaphragm removed. The method further includes joining the coupon to the turbine diaphragm. At least a portion of the coupon is a pre-sintered preform. The treated turbine diaphragm includes a substrate and a coupon joined to the substrate, wherein at least a portion of the coupon is a pre-sintered preform.

20 Claims, 2 Drawing Sheets

(51) Int. Cl.
  *B23K 35/02* (2006.01)
  *F01D 25/00* (2006.01)
(52) U.S. Cl.
  CPC .............. *F05D 2230/237* (2013.01); *F23R 2900/00019* (2013.01)

(56) References Cited

U.S. PATENT DOCUMENTS

| | | | |
|---|---|---|---|
| 9,321,115 B2 | 4/2016 | Miglietti et al. | |
| 2005/0166397 A1* | 8/2005 | Ng | B23K 35/0238 |
| | | | 29/889.1 |
| 2007/0077148 A1* | 4/2007 | Bird | B23P 6/002 |
| | | | 416/223 R |
| 2007/0163684 A1 | 7/2007 | Hu | |
| 2010/0193574 A1 | 8/2010 | Cretegny et al. | |
| 2010/0290902 A1* | 11/2010 | Gaul | B23P 6/005 |
| | | | 415/209.2 |
| 2012/0180494 A1* | 7/2012 | Bailey | F23K 5/007 |
| | | | 60/772 |
| 2012/0243981 A1* | 9/2012 | Park | F01D 25/24 |
| | | | 415/200 |
| 2013/0082446 A1 | 4/2013 | Pezzutti | |
| 2013/0230403 A1 | 9/2013 | Sassatelli et al. | |
| 2013/0294904 A1* | 11/2013 | Hunt | B23P 6/005 |
| | | | 415/208.1 |
| 2015/0367456 A1* | 12/2015 | Ozbaysal | C22C 19/007 |
| | | | 419/8 |

FOREIGN PATENT DOCUMENTS

| | | |
|---|---|---|
| EP | 2 623 720 A2 | 8/2013 |
| EP | 2 660 003 A2 | 11/2013 |
| JP | 2010-069568 A | 4/2010 |

\* cited by examiner

TREATED TURBINE DIAPHRAGM AND METHOD FOR TREATING A TURBINE DIAPHRAGM

FIELD OF THE INVENTION

The present invention is generally directed to a treated turbine component and a method of treating a turbine component. More specifically, the present invention is directed to a treated turbine diaphragm and a method of treating a turbine diaphragm.

BACKGROUND OF THE INVENTION

Gas turbines for power generation systems must satisfy the highest demands with respect to reliability, power, efficiency, economy, and operating service life. Modern high-efficiency combustion turbines have firing temperatures that exceed about 2,300° F. (1,260° C.), and firing temperatures continue to increase as demand for more efficient engines continues. Many components that form the combustor and "hot gas path" turbine sections are directly exposed to aggressive hot combustion gases. The use of coatings on turbine components such as diaphragms, combustors, combustion liners, combustion transition pieces, combustion hardware, blades (buckets), vanes (nozzles) and shrouds is important in commercial gas turbine engines.

Welding has been largely used to repair turbine components, however it adds detrimental localized heat input and melts underlying material, thus exposing portions of material, which may compromise the joint integrity. In particular, diaphragms, primarily made of cast-iron, are known for being difficult to weld repair.

BRIEF SUMMARY OF THE INVENTION

In an exemplary embodiment, a method for treating a turbine diaphragm is provided. The method includes the step of removing a portion of the turbine diaphragm. The method further includes the step of forming a coupon having a geometry that corresponds to the portion of the turbine diaphragm removed, at least a portion of the coupon being a pre-sintered preform. The method further includes joining the coupon to the turbine diaphragm.

In another exemplary embodiment, a treated turbine diaphragm is provided. The treated turbine diaphragm includes a substrate and a coupon joined to the substrate, wherein at least a portion of the coupon is a pre-sintered preform.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
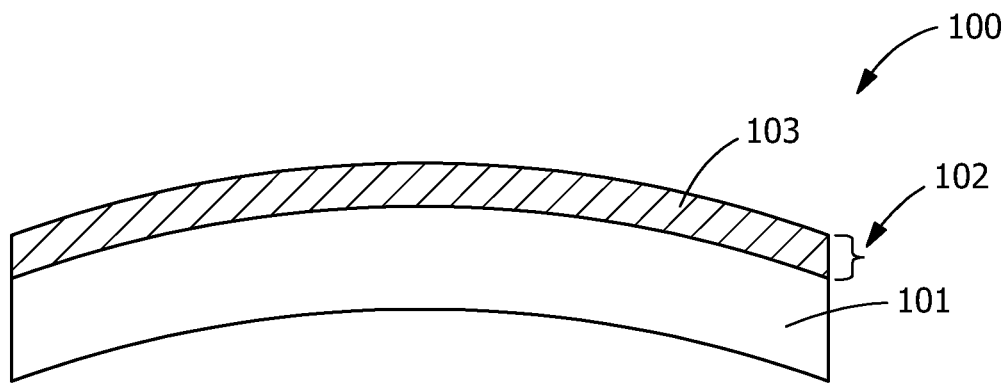
FIG. 1 illustrates a treated turbine diaphragm, according to an exemplary embodiment of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Provided are exemplary methods and treated turbine diaphragms. Embodiments of the present disclosure, in comparison to methods and treated turbine diaphragms not utilizing one or more features disclosed herein, enable repair of hard-to-weld components, such as cast-iron diaphragms, reduce extensive rework required by manual welding, and reduce repair times.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "at least one," as used herein, means one or more and thus includes individual components as well as mixtures/combinations.

The term "comprising" (and its grammatical variations), as used herein, is used in the inclusive sense of "having" or "including" and not in the exclusive sense of "consisting only of."

The term "flexible pre-sintered preform", as used herein, is a sintered alloy material, which retains a high level of flexibility.

The term "rigid pre-sintered preform", as used herein, is a sintered alloy material, which does not retain any flexibility beyond cold working.

As used herein, "BNi-2" refers to an alloy including a composition, by weight, of about 3% iron, about 3.1% boron, about 4.5% silicon, about 7% chromium, and a balance of nickel.

As used herein, "BNi-3" refers to an alloy including a composition, by weight, of about 4.5% silicon, about 3% boron, and a balance of nickel.

As used herein, "BNi-6" refers to an alloy including a composition, by weight, of about 11% phosphorous and a balance of nickel.

As used herein, "BNi-7" refers to an alloy including a composition, by weight, of about 14% chromium, about 10% phosphorous, and a balance of nickel.

As used herein, "IN625" refers to an alloy including a composition, by weight, of between about 20% and about 23% Cr, between about 8% and about 10% Mo, up to about 5% iron (Fe), between about 3.2% and about 4.2% niobium (Nb) plus tantalum (Ta), up to about 1% Co, up to about 0.5% Mn, up to about 0.5% Si, up to about 0.4% Al, up to about 0.4% Ti, up to about 0.1% carbon (C), incidental impurities, and a balance (at least 58%) of Ni.

As used herein, "L605" refers to an alloy including a composition, by weight, of about 20% chromium, about 10% nickel, about 15% tungsten, about 0.1% carbon, and a balance of cobalt.

As used herein, "HASTELLOY X" refers to an alloy including a composition, by weight, of about 22% chromium, about 18% iron, about 9% molybdenum, about 1.5% cobalt, about 0.1% carbon, about 0.6% tungsten, and a balance of nickel.

Figure 2:
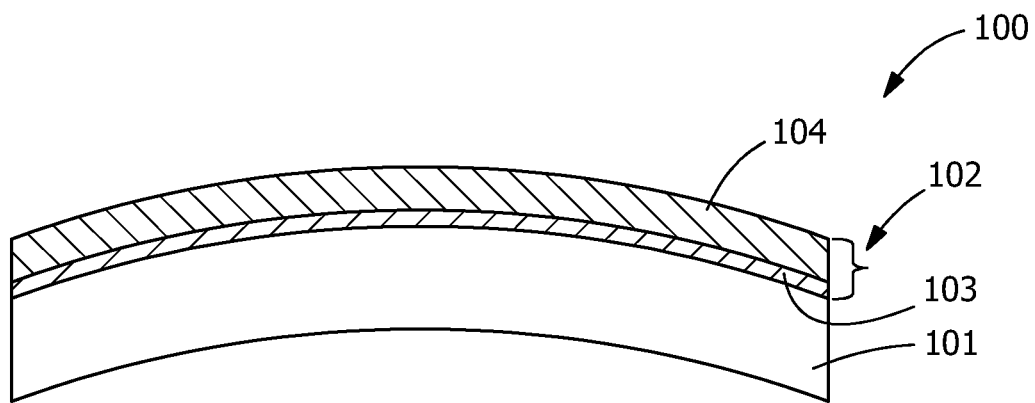
FIG. 2 illustrates a treated turbine diaphragm, according to an alternate exemplary embodiment of the present disclosure.
Figure 3:
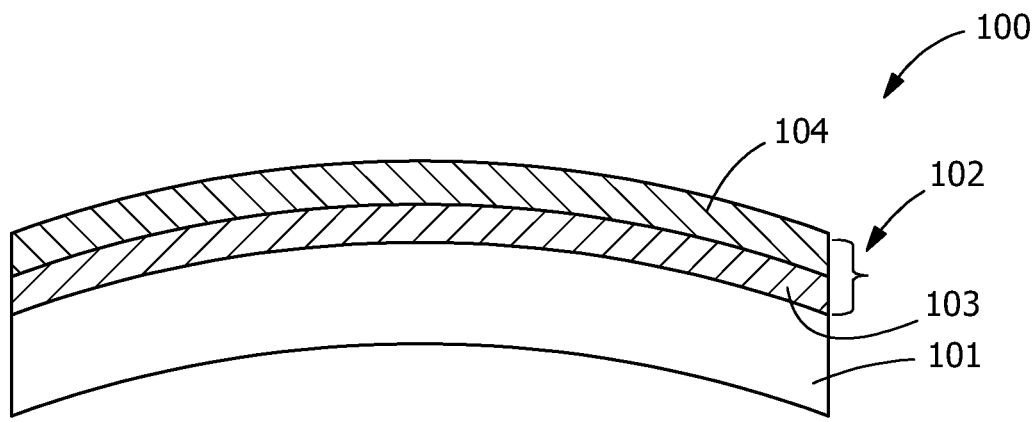
FIG. 3 illustrates a treated turbine diaphragm, according to an alternate exemplary embodiment of the present disclosure.

With reference to FIGS. 1-3, a treated turbine diaphragm 100 is provided. The treated turbine diaphragm 100 includes a substrate 101 and a coupon 102 joined to the substrate 101, wherein at least a portion of the coupon 102 is a pre-sintered preform. In an embodiment, the treated turbine diaphragm 100 may consist of a substrate 101 and a coupon 102 joined to the substrate 101, wherein at least a portion of the coupon 102 is a pre-sintered preform. The coupon 102 provides erosion and/or wear resistance to the treated turbine diaphragm 100. In an embodiment, the substrate 101 is a seal rail of a turbine diaphragm, the seal rail being exposed to hot gas and abraded by other turbine components such as vane(s).

With reference to FIG. 1, treated turbine diaphragm 100 includes a coupon 102 that includes, consists essentially of or consists of a pre sintered preform 103. In one embodiment, the pre-sintered preform 103 is a flexible pre-sintered preform or a rigid pre-sintered preform. In one embodiment, the pre-sintered preform 103 may form, but not be limited to, a homogenous or bi-layer formation. The pre-sintered preform 103 may include a first material having a first melting point and a second material having a second melting point, the first melting point being higher than the second melting point. For the bi-layer formation, the lower side of the bi-layer formation may contain greater amount of the second material having a lower melting point, and thus lead to joining of the pre-sintered preform to the substrate 101. The pre-sintered preform 103 may include, but not be limited to, BNi-2, BNi-3, BNi-6, BNi-7, a mixture of IN625 with BNi-2, BNi-3, BNi-6 or BNi-7, or a combination thereof. In one embodiment, the pre-sintered preform 103 may include a mixture of IN625 with BNi-2, BNi-3, BNi-6 or BNi-7, wherein the ratio of IN625 to BNi-2, BNi-3, BNi-6, or BNi-7 is, by weight, from about 70:30 to about 40:60 or from about 60:40 to about 50:50, including increments, intervals, and sub-range therein. In one embodiment, the treated turbine diaphragm does not include any layer(s) on top of the pre-sintered preform 103. In one embodiment, there is no more layer(s) between the pre-sintered preform 103 and the substrate 101. In one embodiment, there is at least one intermediate layer(s) between the pre-sintered preform 103 and the substrate 101, wherein the at least one intermediate layer(s) has a melting point lower than or equal to the melting point of the pre sintered preform 103.

With reference to FIG. 2, treated turbine diaphragm 100 includes a coupon 102 that includes, consists essentially of or consists of both a pre-sintered preform 103 and a top portion 104 having a higher melting point than the pre-sintered preform 103, the pre-sintered preform 103 being arranged and disposed intermediate the top portion 104 and the turbine diaphragm 100. In one embodiment, a coupon 102 may consist of both a pre-sintered preform 103 and the top portion 104, the pre-sintered preform 103 being arranged and disposed intermediate the top portion 104 and the turbine diaphragm 100. In the embodiment shown in FIG. 2, the pre-sintered preform 103 is a flexible pre-sintered preform. In one embodiment, the pre-sintered preform 103 may comprise a combination of a first material having a first melting point and a second material having a second melting point, the first melting point being higher than the second melting point. The second material may include, but not be limited to, materials selected from AWS alloys and combinations thereof. The first material may include, but not be limited to, materials selected from IN625 and combinations thereof. The flexible pre-sintered preform may be thicker than the top portion 104. The flexible pre-sintered preform may not be thicker than the top portion 104. In one embodiment, the pre-sintered preform 103 may form, but not be limited to, a homogenous or bi-layer formation. In one embodiment, there is at least one intermediate layer(s) between the pre-sintered preform 103 and the substrate 101 and/or the pre-sintered preform 103 and the top portion 104, wherein the at least one intermediate layer(s) has a melting point lower than or equal to the melting point of the pre sintered preform 103.

In one embodiment, the top portion 104 is the same material as the substrate 101. In one embodiment, the top portion 104 includes, consists essentially of or consists of an alloy or superalloy. Suitably, the top portion 104 may include, but not be limited to, nodular cast iron, IN625, L605, HASTELLOYX, or combinations thereof. In one embodiment, the nodular cast iron may include a composition, by weight, of about 18.0-22.0% nickel, about 1.75-2.75% of chrome, about 1.0-3.0% of silicon, about not more than 0.5% of copper, about 0.70-1.25% of manganese, about not more than 3.0% of carbon, and a balance of iron.

With reference to FIG. 3, treated turbine diaphragm 100 includes a coupon 102 that includes, consists essentially of or consists of both a pre-sintered preform 103 and a top portion 104 having a higher melting point than the pre-sintered preform 103, the pre-sintered preform 103 being arranged and disposed intermediate the top portion 104 and the turbine diaphragm 100. The pre-sintered preform 103 bonds the coupon 102 to the substrate of the turbine diaphragm 100. In one embodiment, a coupon 102 may consist of both a pre-sintered preform 103 and a top portion 104 having a higher melting point than the pre-sintered preform 103, the pre-sintered preform 103 being arranged and disposed intermediate the top portion 104 and the turbine diaphragm 100. The top portion 104 is the same material as the substrate 101. In the embodiment shown in FIG. 3, the pre-sintered preform 103 is a rigid pre-sintered preform. The pre-sintered preform 103 may comprise a combination of a first material having a first melting point and a second material having a second melting point, the first melting point being higher than the second melting point. The second material may include materials selected from AWS alloys and combinations thereof. The first material may include materials selected from IN625 and combinations thereof. In one embodiment, the rigid pre-sintered preform may be thicker than the top portion 104. The rigid pre-sintered preform may not be thicker than the top portion 104. In one embodiment, the pre-sintered preform 103 may form, but not be limited to, a homogenous or bi-layer formation. In one embodiment, there is at least one intermediate layer(s) between the pre-sintered preform 103 and the substrate 101 and/or the pre-sintered preform 103 and the top portion 104, wherein the at least one intermediate layer(s) has a melting point lower than or equal to the melting point of the pre sintered preform 103.

In one embodiment, the top portion 104 is the same material as the substrate 101. In an embodiment, the top portion 104 includes, consists essentially of or consists of an alloy or superalloy. Suitably, the top portion may include, but not be limited to, nodular cast iron, IN625, L605, Hast-X, or combinations thereof.

In one embodiment, the substrate 101 includes cast iron. Suitably, the substrate 101 may include, consist essentially of or consist of a material selected from the group consisting of nodular iron, stainless steel and combinations thereof. In one embodiment, the nodular cast iron may include a composition, by weight, of about 18.0-22.0% nickel, about 1.75-2.75% of chrome, about 1.0-3.0% of silicon, about up to 0.5% of copper, about 0.70-1.25% of manganese, and about 3.0% of carbon.

In one embodiment, an additional coating(s) may be placed on the top of the coupon 102. For example, in one embodiment, a thin layer of L605 material is coated on the top of the coupon 102 via weld cladding or thermal spray process to add abrasion resistance to the part surface.

Figure 4:
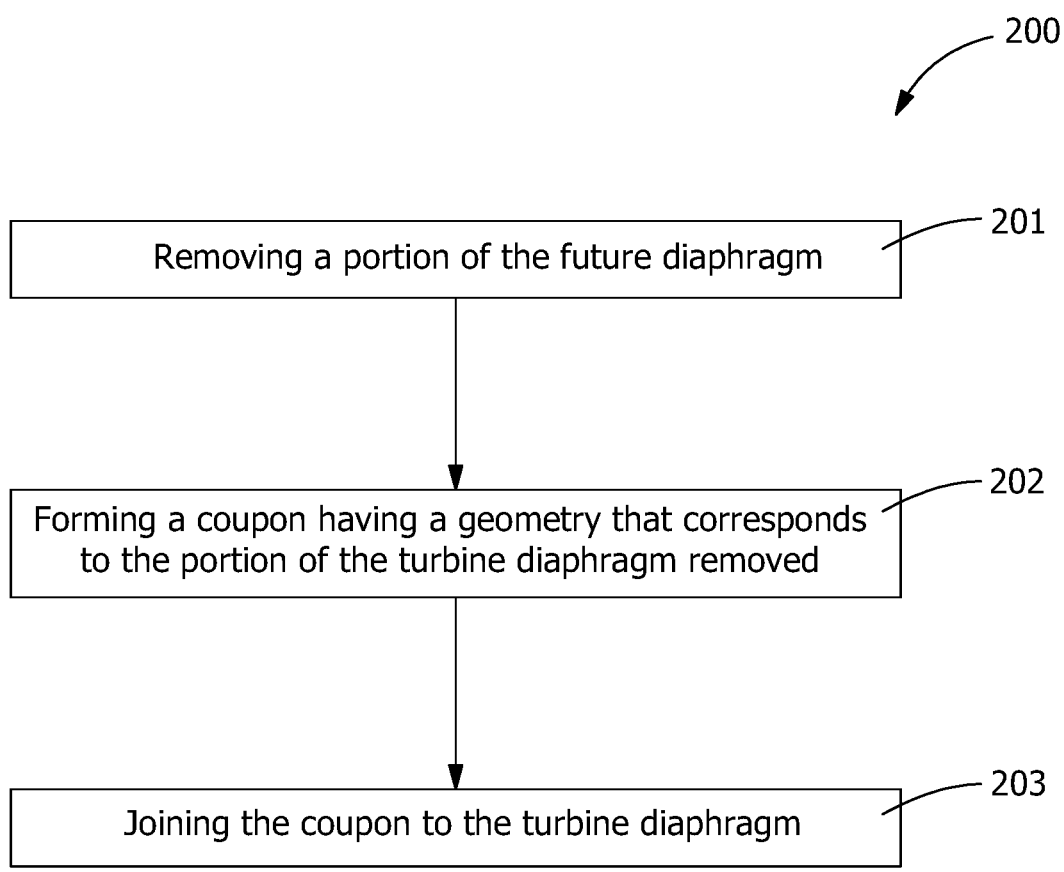
FIG. 4 illustrates a method, according to an exemplary embodiment of the present disclosure.

With reference to FIG. 4, a method 200 for treating a turbine diaphragm 100 is provided. The method 200 includes the step of removing a portion of the turbine diaphragm 100 (step 201). In one embodiment, the portion of the turbine diaphragm is an entire substrate. In an embodiment, the portion of the turbine diaphragm is a portion of a substrate. The method 200 further includes the step of forming a coupon 102 having a geometry that corresponds to the portion of the turbine diaphragm removed to form a treatment area (step 202). The method 200 further includes joining the coupon to the turbine diaphragm 100 (step 203). In an embodiment, at least a portion of the coupon 102 is a pre-sintered preform.

In one embodiment, the removing (step 201) is selected from the group consisting of grinding, machining, scraping, and combinations thereof. In one embodiment, the removing (step 201) may be done by wire Electrical Discharge Machining (EDM). In one embodiment, the joining (step 203) is selected from the group consisting of mechanical joining, brazing, and combinations thereof.

Suitably, the method 200 may further comprise cleaning the turbine diaphragm 100 after removing the portion of the turbine component 100. Suitably, joining may further comprise heating the turbine diaphragm 100 in a furnace or other suitable furnace. In one embodiment, the joining is accomplished by positioning the coupon on the treatment area and heating the diaphragm to a temperature from 1800 to about 1950 or from about 1850 to about 1900, including increments, intervals and sub-range therein. Upon heating the turbine diaphragm 100, the second material of the pre-sintered preform 103 melts and joins further the substrate 101 and the top portion 104, functioning as a filler.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for treating a turbine diaphragm, comprising:
   removing a portion of the turbine diaphragm;
   forming a coupon having a geometry that corresponds to the portion of the turbine diaphragm that has been removed; and
   joining the coupon to the turbine diaphragm,
   wherein at least a portion of the coupon is a pre-sintered preform comprising a first homogenous formation of a first material having a first melting point and a second material having a second melting point, the first melting point being higher than the second melting point, and
   wherein the turbine diaphragm is a gas turbine diaphragm.

2. The method of claim 1, wherein the portion of the turbine diaphragm includes cast iron.

3. The method of claim 1, wherein the portion of the turbine diaphragm includes a material selected from the group consisting of nodular iron, stainless steel and combinations thereof.

4. The method of claim 1, wherein the removing is selected from the group consisting of grinding, machining, scraping, and combinations thereof.

5. The method of claim 1, wherein the joining is selected from the group consisting of mechanical joining, brazing, and combinations thereof.

6. The method of claim 1, further comprising cleaning the turbine diaphragm after removing the portion of the turbine component.

7. The method of claim 1, further comprising heating the turbine diaphragm in furnace.

8. A treated turbine diaphragm, comprising:
   a substrate; and
   a coupon joined to the substrate,
   wherein at least a portion of the coupon is a pre-sintered preform comprising a first homogenous formation of a first material having a first melting point and a second material having a second melting point, the first melting point being higher than the second melting point, and
   wherein the treated turbine diaphragm is a gas turbine diaphragm.

9. The treated turbine diaphragm of claim 8, wherein the substrate includes cast iron.

10. The treated turbine diaphragm of claim 8, wherein the substrate includes a material selected from the group consisting of nodular iron, stainless steel and combinations thereof.

11. The treated turbine diaphragm of claim 8, wherein the coupon is entirely the pre-sintered preform.

12. The treated turbine diaphragm of claim 8, wherein the coupon includes both the pre-sintered preform and a top portion having a higher melting point than the pre-sintered preform, the pre-sintered preform being arranged and disposed between the top portion and the substrate.

13. The treated turbine diaphragm of claim 8, wherein the pre-sintered preform further comprises a lower side of the pre-sintered preform having a higher proportion of the second material than in the first homogenous formation, the first homogenous formation and the lower side defining a bi-layer formation.

14. The treated turbine diaphragm of claim 12, wherein the top portion is the same material as the substrate.

15. The treated turbine diaphragm of claim 8, wherein the pre-sintered preform is a flexible pre-sintered preform.

16. The treated turbine diaphragm of claim 8, wherein the pre-sintered preform is a rigid pre-sintered preform.

17. The treated turbine diaphragm of claim 8, further including a mechanical joint joining the coupon to the substrate.

18. The treated turbine diaphragm of claim 8, further including a braze joint joining the coupon to the substrate.

19. The treated turbine diaphragm of claim 8, wherein the substrate is a seal rail of the turbine diaphragm.

20. The treated turbine diaphragm of claim 8, wherein the coupon includes a geometry that corresponds to a portion of a turbine diaphragm which has been removed from the turbine diaphragm such that the replacement of the portion of the turbine diaphragm with the coupon forms the treated turbine diaphragm.

\* \* \* \* \*